(12) United States Patent
Ogino

(10) Patent No.: US 10,895,837 B2
(45) Date of Patent: Jan. 19, 2021

(54) IMAGE FORMING APPARATUS AND CONTROL METHOD

(71) Applicant: SHARP KABUSHIKI KAISHA, Sakai (JP)

(72) Inventor: Kumiko Ogino, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 16/410,473

(22) Filed: May 13, 2019

(65) Prior Publication Data

US 2019/0354051 A1    Nov. 21, 2019

(30) Foreign Application Priority Data

May 18, 2018  (JP) ................................. 2018-096398

(51) Int. Cl.
*G06F 3/12* (2006.01)
*G03G 15/00* (2006.01)

(52) U.S. Cl.
CPC ....... *G03G 15/5016* (2013.01); *G03G 15/556* (2013.01); *G06F 3/121* (2013.01); *G06F 3/1207* (2013.01); *G06F 3/1235* (2013.01)

(58) Field of Classification Search
None
See application file for complete search history.

(56) References Cited

U.S. PATENT DOCUMENTS

| | | | |
|---|---|---|---|
| 6,903,834 B1* | 6/2005 | Mori ..................... | G06F 3/1207 358/1.14 |
| RE43,778 E * | 10/2012 | Nimura .............. | H04N 1/00132 358/1.15 |
| 2002/0159786 A1 | 10/2002 | Yoshimura et al. | |
| 2006/0215206 A1* | 9/2006 | Tamura ................ | G06K 15/005 358/1.14 |
| 2013/0057920 A1* | 3/2013 | Nagata ............... | H04N 1/00474 358/1.16 |

FOREIGN PATENT DOCUMENTS

| | | |
|---|---|---|
| JP | 2002-031987 A | 1/2002 |
| JP | 2004-017605 A | 1/2004 |

* cited by examiner

*Primary Examiner* — Dov Popovici
(74) *Attorney, Agent, or Firm* — ScienBiziP, P.C.

(57) ABSTRACT

An image forming apparatus includes an image forming unit, an image output unit, a transport unit that transports a recording medium, a display unit that displays a screen, and a controller that controls the units. The controller detects a state change of each unit of the image forming apparatus, and exerts control so as to cause the display unit to display, in accordance with the detected state change of the unit, an image indicating the state change of the unit. The image indicating the state change of the unit includes a color and a figure which represent a reason of the state change.

12 Claims, 12 Drawing Sheets

IMAGE FORMING APPARATUS AND CONTROL METHOD

BACKGROUND

1. Field

The present disclosure relates to an image forming apparatus and the like.

2. Description of the Related Art

An image forming apparatus for shared use, especially for public use, has various state changes of which a user or an apparatus administrator, who is present around the apparatus or in the same room, is to be notified. Examples of the state changes include running out of paper or toner, breakdowns such as a paper jam, and things left behind.

Such a state change is notified by using a message or an icon on the operation screen of an image forming apparatus. However, this notification is given through a small display just in a limited area on the screen. Thus, there has arisen a problem that it is difficult for a user, who is not directly using the apparatus, to view the display.

In the case of an image forming apparatus for public use, a screen saver may be displayed on the screen while the apparatus is waiting. Thus, reception of a notification about such an error described above is likely to be delayed when the apparatus is in the waiting state.

Japanese Unexamined Patent Application Publication No. 2002-31987 discloses how to give, in accordance with the state of an apparatus, a notification through a change of the hue and color shade of the backlight or characters, and blinking of the backlight.

Japanese Unexamined Patent Application Publication No. 2004-17605 discloses a technique in which tunes are assigned to operational states of a printer so that the state is notified.

According to the disclosure of Japanese Unexamined Patent Application Publication No. 2002-31987, more than a few types of information may be transmitted, but it is difficult to associate the types of information with individual errors. For example, notification of information about the degrees of consumption of consumables is not disclosed.

According to the disclosure of Japanese Unexamined Patent Application Publication No. 2004-17605, it is difficult to recognize the states, including individual errors, in association with the tunes. In particular, there is information which is difficult to impart depending on the content of the information.

It is desirable to provide an image forming apparatus and the like. The image forming apparatus and the like are capable of displaying a screen which has excellent visibility and which enables a change in the state of the apparatus to be notified so that a target to be notified easily understands the notification.

SUMMARY

According to an aspect of the disclosure, there is provided an image forming apparatus including an image forming unit, an image output unit, a transport unit that transports a recording medium, a display unit that displays a screen, and a controller that controls the units. The controller detects a state change of each unit of the image forming apparatus, and exerts control so as to cause the display unit to display, in accordance with the detected state change of the unit, an image indicating the state change of the unit. The image indicating the state change of the unit includes a color and a figure which represent a reason of the state change.

According to another aspect of the disclosure, there is provided a control method for an image forming apparatus including an image forming unit, an image output unit, a transport unit that transports a recording medium, a display unit that displays a screen, and a controller that controls the units. The method includes detecting a state change of each unit of the image forming apparatus; and displaying, on the display unit, an image indicating the detected state change of the unit in accordance with the state change of the unit. The image indicating the state change of the unit includes a color and a figure which represent a reason of the state change.

BRIEF DESCRIPTION OF THE DRAWINGS

FIG. 4A illustrates a screen indicating the normal state, FIG. 4B illustrates a screen indicating a notification that paper of a specific size is near end or has run out, and FIG. 4C illustrates a screen indicating a notification that paper of two or more sizes is near end or has run out;

FIG. 6A illustrates a screen indicating the normal state, FIG. 6B illustrates a screen indicating a notification that toner of a specific color (magenta) is near end or has run out, and FIG. 6C illustrates a screen for urging an operation of addressing the out-of-toner state, after a certain period has elapsed, when the out-of-toner state has not been addressed;

FIG. 8A illustrates a screen indicating the normal state, FIG. 8B illustrates a screen indicating a notification that a paper jam has occurred, and FIG. 8C illustrates a screen indicating a notification indicating that a breakdown has occurred;

DESCRIPTION OF THE EMBODIMENTS

First Embodiment

Figure 1:
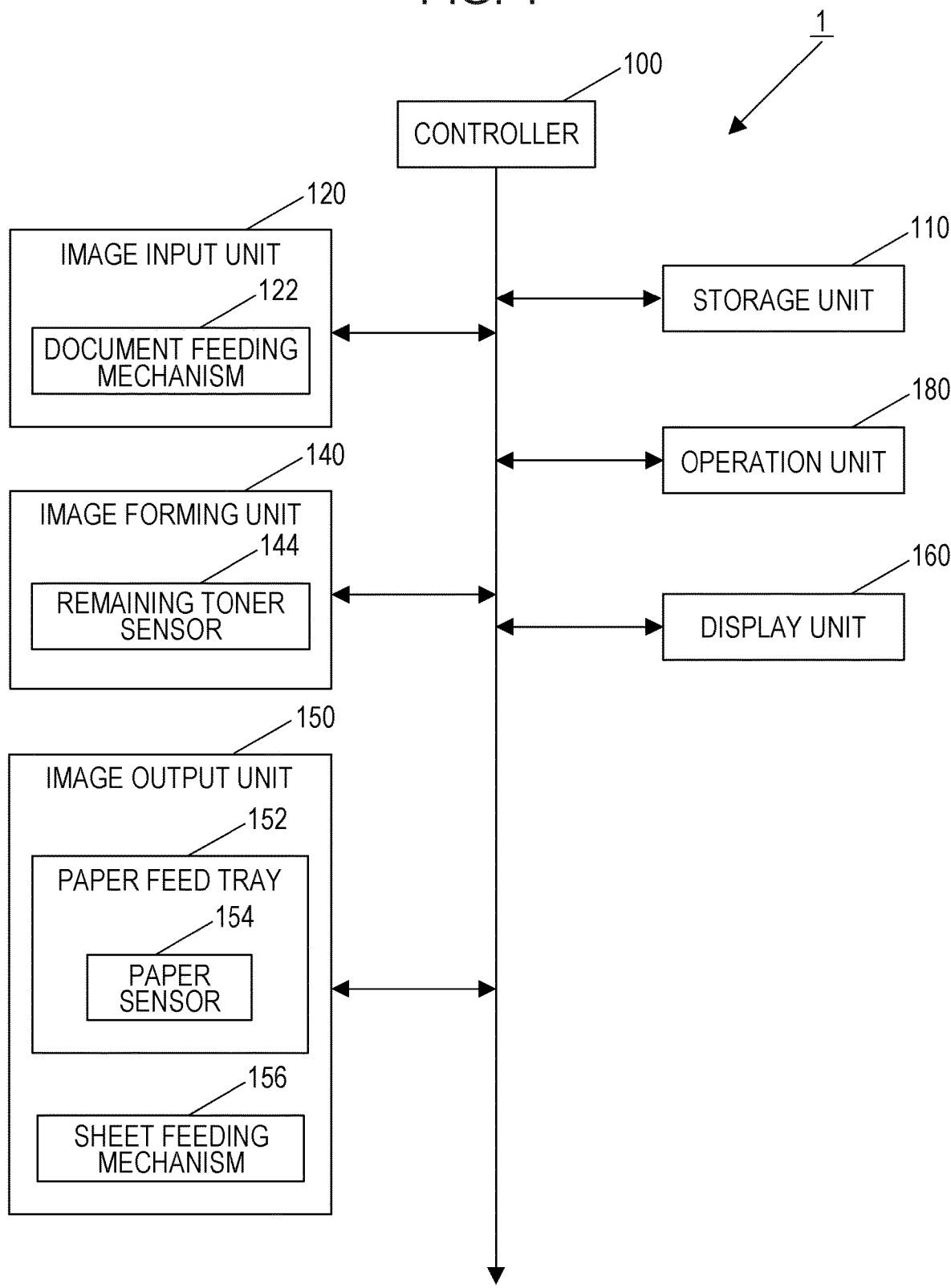
FIG. 1 is a block diagram illustrating an image forming apparatus provided by the present disclosure.

FIG. 1 is a block diagram illustrating the configuration of an image forming apparatus 1 according to a first embodiment.

As illustrated in FIG. 1, the image forming apparatus 1 according to first and second embodiments includes a controller 100, a storage unit 110, an image input unit 120, an image forming unit 140, an image output unit 150, a display unit 160, and an operation unit 180. The image input unit 120 includes a document feeding mechanism 122. The image forming unit 140 includes a remaining toner sensor 144. The image output unit 150 includes a paper feed tray 152 and a sheet feeding mechanism 156 (transport unit). The paper feed tray 152 includes a paper sensor 154.

The controller 100 is a functional unit for controlling the entire image forming apparatus 1. The controller 100 implements various types of functions by reading, for execution, various types of programs stored in the storage unit 110. The controller 100 is formed, for example, of a central processing unit (CPU).

The storage unit 110 is a functional unit snoring various types of programs and various types of data which are used for operations of the image forming apparatus 1. The storage unit 110 is formed, for example, of a solid state drive (SSD), a semiconductor memory, or a hard disk drive (HDD).

The image input unit 120 reads the image on a document to generate image data, and is formed, for example, of a scanner including a device such as a charge coupled device (CCD) for converting optical information into an electric signal. In addition to a scanner and the like, the image input unit 120 may obtain, from the outside, an image captured by a digital camera or the like, or may receive document data from another terminal via a storage medium, such as a Universal Serial Bus (USB) memory or a CompactFlash™ card.

The image forming unit 140 is a functional unit for forming image data on a recording medium (for example, a sheet of recording paper). The image forming unit 140 is formed, for example, of a laser printer using an electrophotographic system.

The image output unit 150 is a functional unit for recording, on a recording medium, an image which has been formed by the image forming unit 140. A sheet of recording paper, which is fed from the paper feed tray 152, is transported by using the sheet feeding mechanism 156, and is output to an output tray after an image is formed on the surface of the sheet of recording paper.

The display unit 160 is a functional unit of displaying, for example, guidance on a user's use of the image forming apparatus 1, various types of content used by a user, and information for an apparatus administrator about the states of the units of the image forming apparatus 1 and their changes. For example, the display unit 160 is formed, for example, of a liquid crystal display (LCD) or an organic electro luminescence (EL) display. In the entire display area of the display unit 160, a whole image, in which figures are displayed, is displayed.

The operation unit 180 is a functional unit of receiving operational input from a user. For example, the operation unit 180 is implemented by using software keys on a touch panel formed integrally with the display unit 160 or hardware keys. The operation unit 180 may be implemented by using external devices (for example, an external keyboard and an external mouse).

By using these functional units, the image forming apparatus 1 displays, on the display unit 160, a message, which is to be displayed while a user performs operations, and an image which notifies an apparatus administrator of a state change of each unit, through control exerted by the controller 100.

In the case of the image forming apparatus 1, a user, who is using the image forming apparatus 1, performs an operation on the image forming apparatus 1 through the screen of the display unit 160. In this case, on the screen, a display screen including a window, on which a user's attention is being paid, and the background is designed.

For the image forming apparatus 1, an apparatus administrator, who replenishes its consumables and addresses a trouble, for example, when the image forming apparatus 1 is out of order, manages the image forming apparatus 1. If the entire screen and the background of the screen of the display unit 160 are designed so that the apparatus administrator obtains information used to recognize the state of the image forming apparatus 1, the apparatus administrator may manage the image forming apparatus 1 efficiently.

Figure 2:
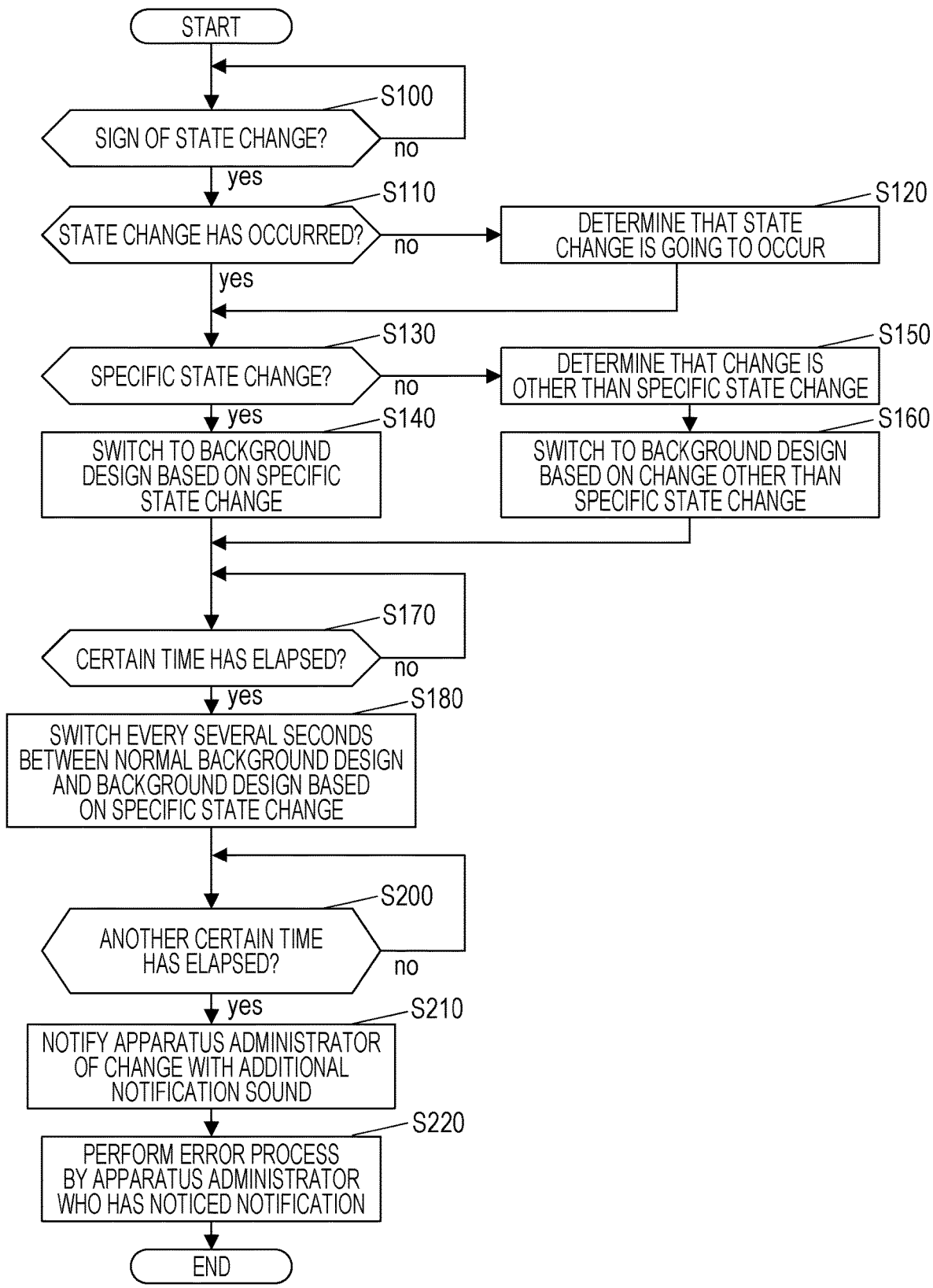
FIG. 2 is a flowchart of operations performed when the state of each unit is changed, according to a first embodiment of an image forming apparatus provided by the present disclosure.

Operations performed when a state change occurs, according to the first embodiment of the image forming apparatus 1, will be described on the basis of the flowchart in FIG. 2.

While the image forming apparatus 1 operates, the controller 100 determines whether or not there is a sign of a state change on the basis of information from each unit (step S100).

The controller 100 further determines whether or not a state change has occurred (step S110). If a state change has not occurred, the controller 100 determines that a state change is going to occur (step S120). If a state change has occurred, the controller 100 determines whether or not the change indicates a specific state change (step S130). If the controller 100 determines that the change indicates a specific state change, the background design of the display unit 160 is changed to the background design based on the specific state change (S140). If the change is a change other than the specific state change, (step S150), the background design of the display unit 160 is changed to the background design based on the change other than the specific state change (S160).

If the controller 100 determines that a certain time has elapsed without taking measures (step S170), the background of the display unit 160 is switched every several seconds between the normal background design and the background design based on the specific state change so that the apparatus administrator is notified of the change (step S180). If the controller 100 determines that another certain time has elapsed without taking measures (step S200), the apparatus administrator is notified of the change by outputting an additional notification sound (step S210). If the apparatus administrator notices the notification and performs an operation (step S220), the process ends.

Even if the information is useful for an apparatus administrator, a user of the image forming apparatus 1 is not particularly to be informed of the information. Therefore, if the information is indicated by simple signs, such as figures, colors, and their lighting states and motions, the information does not bother a user. Even if the apparatus administrator is located at such a distance that the presence of the apparatus administrator does not bother use of the image forming apparatus 1 by the user who is directly using the image forming apparatus 1, the apparatus administrator is notified of the information sufficiently.

In an actual check of a state change, after a user of the image forming apparatus 1 interrupts or ends their use, the state is checked. Therefore, strictly detailed information is unnecessary. If, in addition to providing a trigger for the apparatus administrator to notice a state change, the information just urges the apparatus administrator to prepare measures that are to be taken, for example, to prepare inventory to replenish consumables, such information is helpful to perform apparatus management operations smoothly, even when the information contains a small amount of information.

In the case where an apparatus administrator does not notice a state change of each unit at once, and where a certain time has elapsed without taking measures, the display of figures described above may be further changed in order to urge the apparatus administrator to notice the state change of the unit. For example, this change may be made through a shade of the color of figures, switching the image and changing the interval between the switching operations, blinking and changing the interval between blinks, or motions and their speed.

There is a type of information of which an apparatus administrator is to be informed but of which a user is not to be informed. For this information, basically, consideration is better to be given so that a user does not feel uncomfortable with the information. If determination as to whether or not a notification is to be given depends on the stage of a state change of each unit, the display may be changed in accordance with the stage.

Information about a change to be notified to an apparatus administrator, and a screen for notifying the change will be further described by taking an example.

Second Embodiment

Operations performed in the out-of-paper state which also includes the state in which paper is near end, according to the second embodiment of the image forming apparatus 1, will be described by taking, as an example, particularly the case in which the paper size is A4, on the basis of the flowchart in FIG. 3.

While the image forming apparatus 1 operates, the controller 100 determines whether or not the remaining amount of paper is equal to or less than a threshold, on the basis of information about the remaining amount of paper from the paper sensor 154 (step S300).

The controller 100 further determines whether or not the remaining amount of paper is equal to zero (step S310). If the remaining amount is not equal to zero, the controller 100 determines that paper is near end (step S320), and determines whether or not the size is A4 (step S330). If the remaining amount is equal to zero, the controller 100 determines whether or not the size is A4 (step S330). If the controller 100 determines that the size is A4, the background design of the display unit 160 is changed to the background design based on the A4 size (S340). If the size is other than A4 (step S350), the background design of the display unit 160 is changed to the background design based on the size other than the A4 size (S360).

If the controller 100 determines that a certain time has elapsed without taking measures (step S370), the background of the display unit 160 is switched every several seconds between the background design in the normal state and the background design based on the A4 size so that an apparatus administrator is notified of the out-of-paper state (step S380). If the controller 100 determines that another certain time has elapsed without taking measures (step S200), an apparatus administrator is notified with an additional notification sound (step S210). When the apparatus administrator notices the notification and performs an error process (step S220), the process ends.

Figure 3:
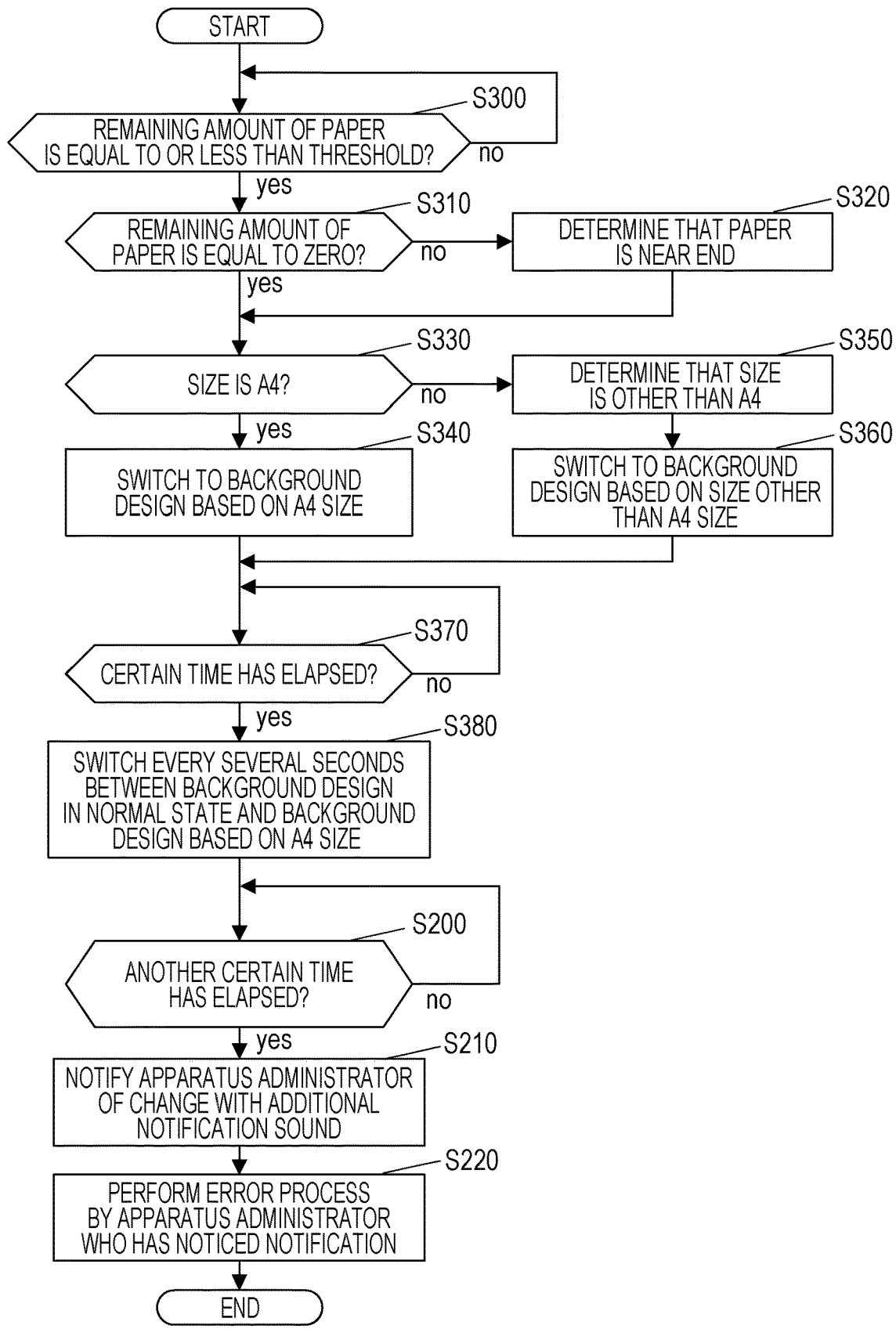
FIG. 3 is a flowchart of operations performed in the out-of-paper state which also includes the state in which paper is near end, according to a second embodiment of an image forming apparatus provided by the present disclosure.

In FIG. 3, the size used in the determination in step S330 is switched among various sizes, such as B, B4, and A3. Thus, one of the paper sizes is specified.

The background design, which is used in steps S340 and S360 in FIG. 3 and which is based on information about the sheet of paper, uses, for example, a "rectangle" which represents a sheet of paper. If rectangles are displayed on the background of the operation display screen of the display unit 160, this indicates that some change occurs in sheets of paper. Such a notification may indicate a type of sign or code. In order that an apparatus administrator, who views the rectangular figures, is able to recognize that a change in sheets of paper has occurred, such a precondition that an apparatus administrator knows and remembers the relationship between the figure and sheets of paper is to be satisfied. However, such an association is easily conceived, and the precondition is not so complicated. Thus, an apparatus administrator does not feel a burden about it.

Figure 4A:
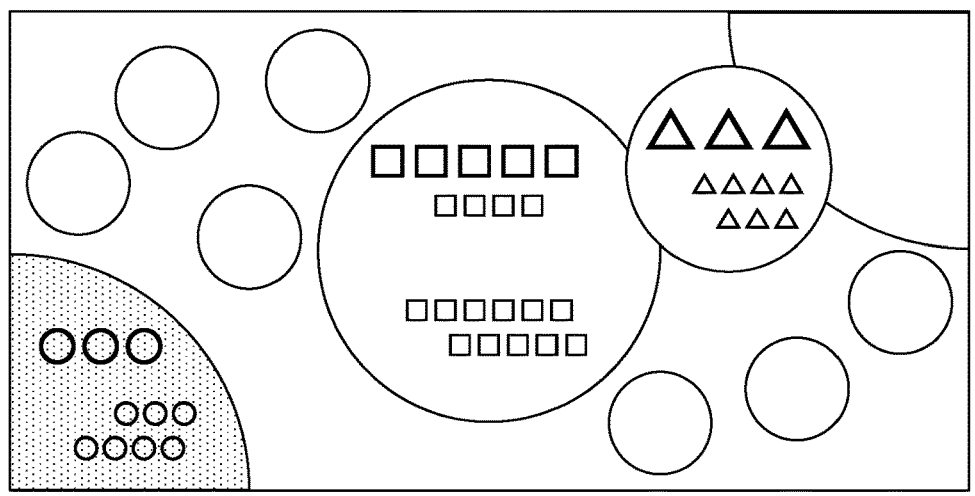
FIGS. 4A to 4C are diagrams illustrating exemplary changes of a screen in response to a notification about the out-of-paper state, according to the second embodiment of the image forming apparatus provided by the present disclosure, where
Figure 4B:
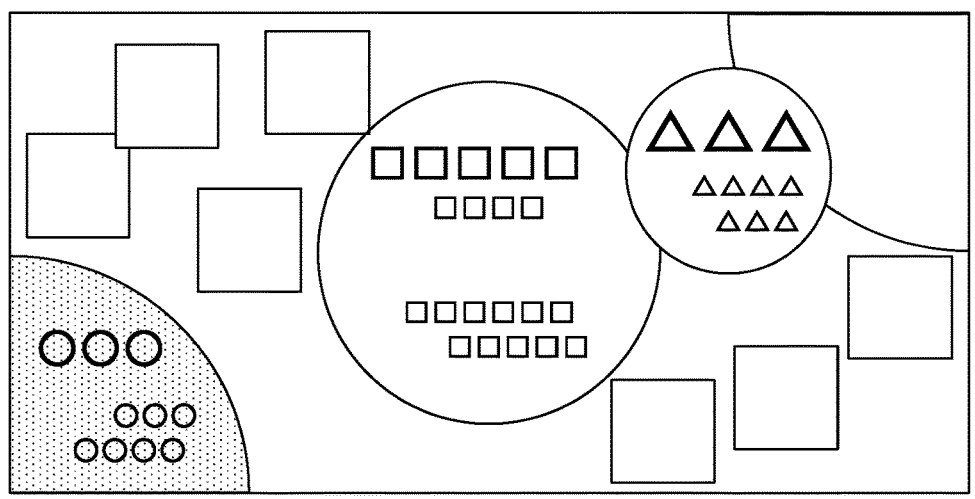

If the changed figure is rectangular, a figure in a solid color or a figure from which the change is easily recognized may be displayed before the change, that is, in the normal state. For example, if the figure in the normal state is, for example, a circle, or an ellipse or oval, the contrast to a rectangle is clear, and a change is easily recognized. As illustrated in FIG. 4A, the background design using circular figures, which is displayed before the out-of-paper state occurs, is changed to rectangles as illustrated in FIG. 4B so that the rectangles are suggestive of sheets of paper. Thus, the out-of-paper state is indicated. Even viewed at a few spaces distant from the display unit 160, the change may be recognized easily. The figures are not limited to a rectangle, a circle, and an ellipse or oval which are taken as examples.

A desirable change in the figure as described above is to be determined in the consideration that the change is displayed on the display screen of the display unit 160 on which, as a matter of course, a user other than an apparatus administrator may be using the image forming apparatus 1. Assume that the user is using the image forming apparatus 1 and a change in the figures occurs in the user's sight. However, the user concentrates a part (window) in which operational information is displayed. In this case, even if the change in the figures occurs on the background, the user does not recognize the change particularly consciously and does not experience stress caused by a strange or annoying feeling. When a user other than an apparatus administrator is using the image forming apparatus 1, if there occurs a change which is not urgent, a change in the screen may be made after the user ends use of the image forming apparatus 1 and leaves the image forming apparatus 1 to an area in which the user is not capable of operating the image forming apparatus 1.

In the case where an apparatus administrator does not notice the out-of-paper state at once and where a certain time has elapsed without taking measures, in order to urge the apparatus administrator to notice the out-of-paper state, the display of figures indicating sheets of paper, which is described above, may be further changed. For example, this change may be made through a shade of the color of figures, switching between images and changing the interval of the switching, blinking and changing the interval between blinks, or motions and their speed.

Depending on the interval of switching between images, the interval between blinks when blinking is used, and the speed of the motions when motions are used, a user may feel annoyed to a large extent. Actually, when paper has run out, an apparatus administrator is to replenish sheets of paper even if use of the image forming apparatus 1 by a user is made to be temporarily interrupted. In this case, it is unnecessary to reduce the interval of switching between images, the interval between blinks, and the speed of motions to such a degree that a user takes no notice of the display.

When a state change of each unit indicates the remaining amount of paper, information of the paper size for which the remaining amount is equal to or less than the threshold may be displayed as the size of figures indicating sheets of paper, or may be displayed by using another method.

Figure 4C:
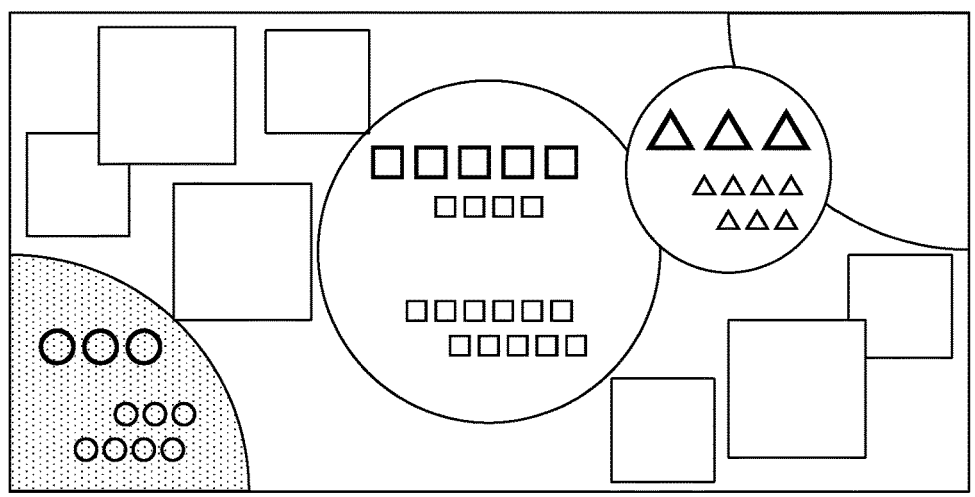

When the remaining amounts for multiple paper sizes are equal to or less than the threshold, this state is indicated by the sizes of figures representing the respective sizes or another method other than the sizes. In this case, the figures representing the respective sizes may be displayed in the same screen at the same time, or may be displayed by switching among the figures alternately. For example, FIG. 4C illustrates a screen in which multiple sizes of paper are displayed at the same time.

Third Embodiment

Operations performed in the out-of-toner state which also includes the state in which toner is near end, according to a third embodiment of the image forming apparatus 1, will be described by taking, as an example, particularly the case in which the toner color is magenta, on the basis of the flowchart in FIG. 5.

While the image forming apparatus 1 operates, the controller 100 checks if the remaining amount of toner is equal to or less than a threshold, on the basis of information about the remaining amount of toner which is obtained from toe remaining toner sensor 144 (step S400).

Figure 6A:
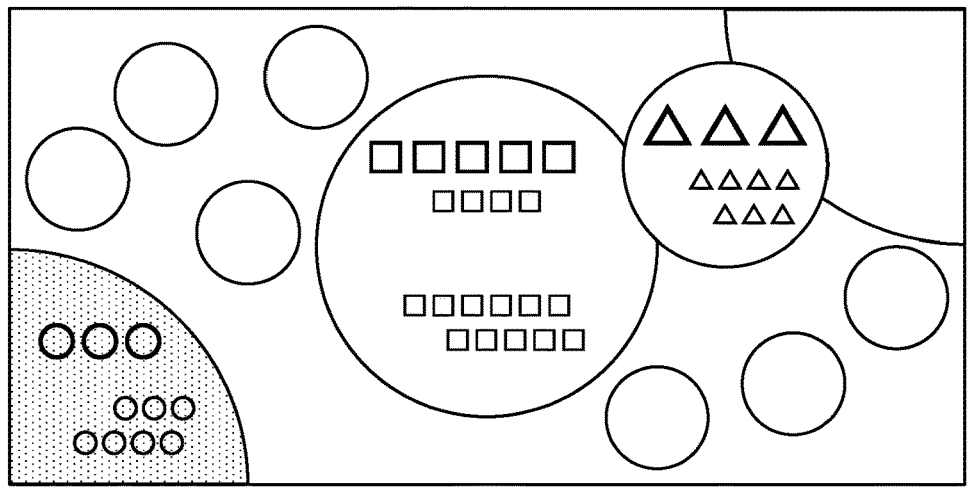
FIGS. 6A to 6C are diagrams illustrating exemplary changes of a screen in response to a notification about the out-of-toner state, according to the third embodiment of the image forming apparatus provided by the present disclosure, where
Figure 6B:
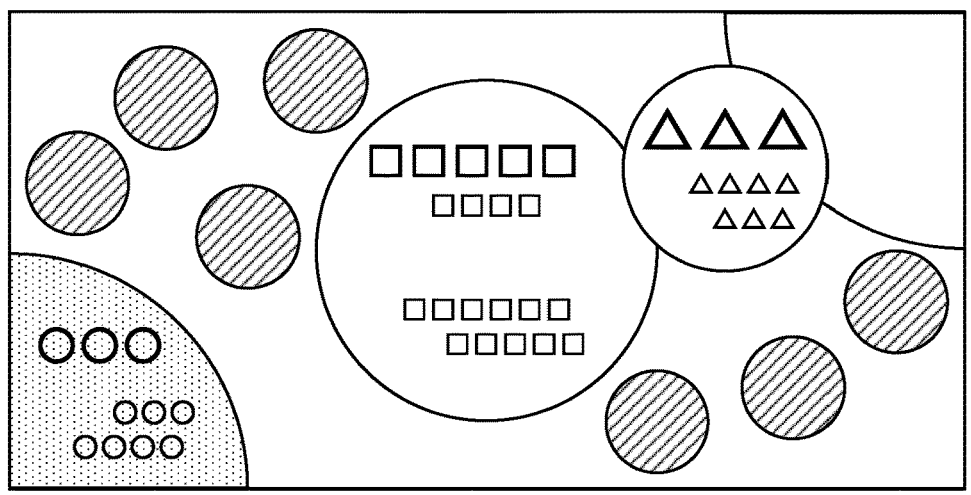

The controller 100 determines whether or not the remaining amount of toner is zero (step S410). If the remaining amount of toner is not zero, the controller 100 determines that toner is near end (step S420), and determines whether or not the toner color is magenta (step S430). If the remaining amount is zero, the controller 100 determines whether or not the toner color is magenta (step S430). If the controller 100 determines that the toner color is magenta, the background design of the display unit 160 is changed to the background design based on magenta (S440). If the toner color is other than magenta (step S450), the background design of the display unit 160 is changed to the background design based on a color other than magenta (S460). That is, the background, which is drawn by using circular figures of a solid color, in the normal state as illustrated FIG. 6A is changed to the background, which is drawn by using hatched figures indicating magenta so as to indicate the state in which magenta toner is near end or has run out, as illustrated in FIG. 6B, in step S440 described above. Thus, the state in which the apparatus is running out or has run out of magenta toner is notified.

If the controller 100 determines that a certain time has elapsed without taking measures (step S470), the background of the display unit 160 is switched every several seconds between the background design in the normal state and the background design based on magenta so that an apparatus administrator is notified of the out-of-toner state (step S480). For example, in FIG. 6C, the background is changed so as to switch between hatched circular figures indicating magenta and solid-color circular figures indicating the normal state. As a result, the change of the screen looks like blinking. If the controller 100 determines that another certain time has elapsed without taking measures (step S200), an apparatus administrator is notified with an additional notification sound (step S210). If the apparatus administrator notices the notification and performs an error process (step S220), the process ends.

Figure 5:
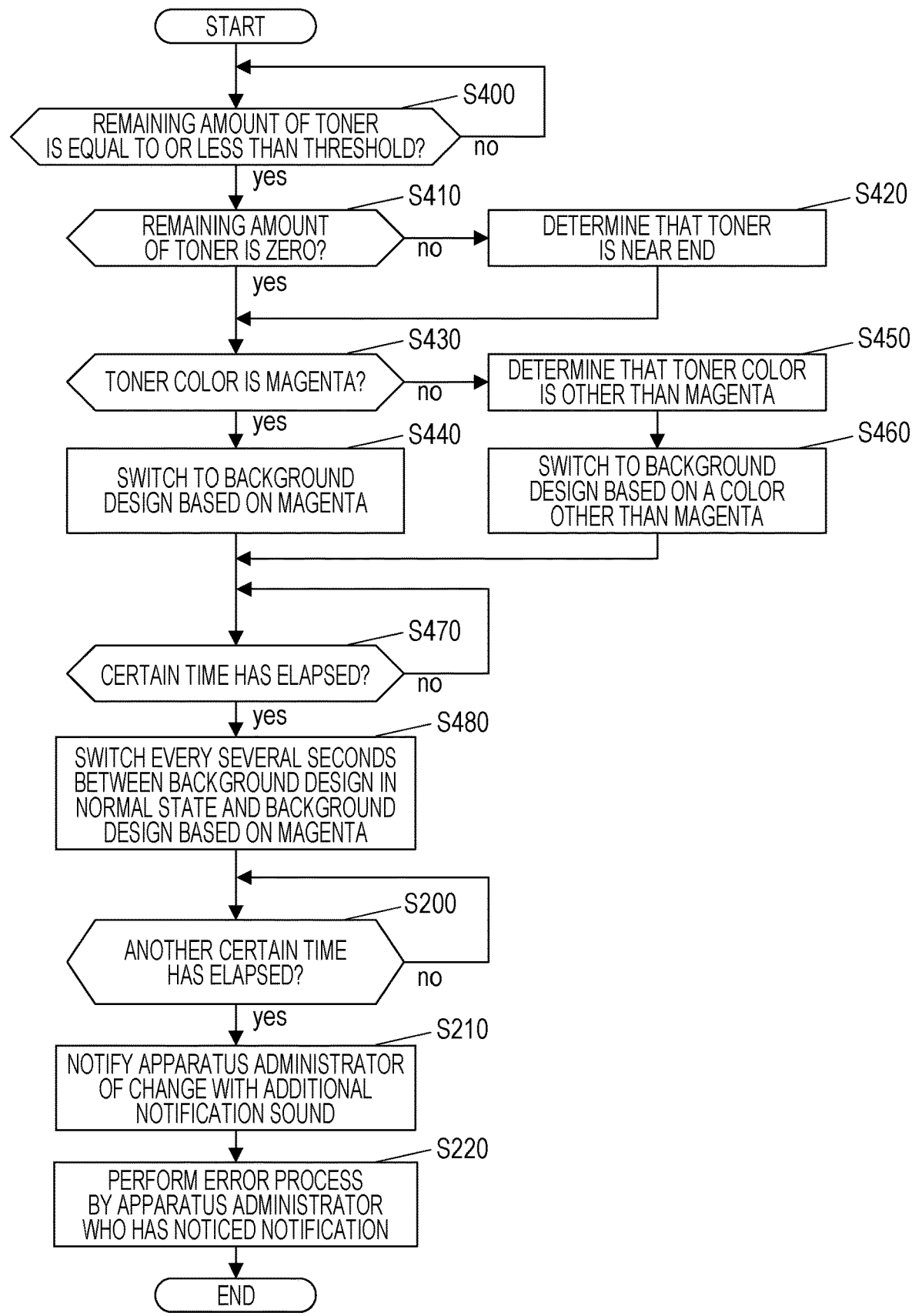
FIG. 5 is a flowchart of operations performed in the out-of-toner state which also includes the state in which toner is near end, according to a third embodiment of an image forming apparatus provided by the present disclosure.
Figure 6C:
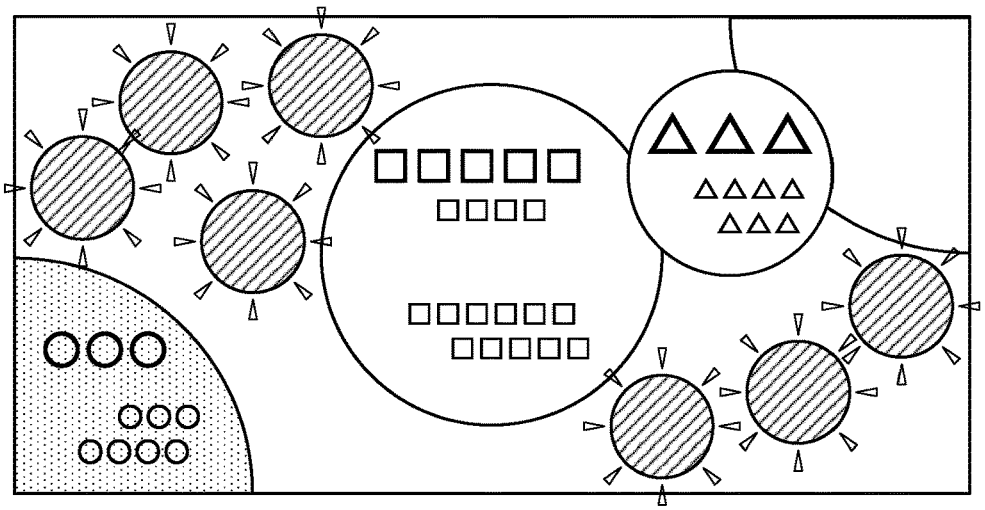

In FIG. 5, the toner color for which the determination in step S430 is made is switched among colors, such as yellow, cyan, and black. Thus, either one of the toner colors is specified. In the changes of the background design in step S440 and step S480, the hatched circular figures are changed to those of the toner color of yellow, cyan, or black in FIGS. 6B and 6C. Thus, the toner color in the out-of-toner state is notified (FIG. 6B), or replenishment of the color toner in the out-of-toner state is urged (FIG. 6).

When a state change of each unit indicates the out-of-toner state, the remaining toner sensor 144 detects the remaining amount of toner. If the remaining amount is equal to or less than the threshold, the remaining toner sensor 144 transmit information about the change of each unit to the controller.

When a state change of each unit indicates the out-of-toner state, in order to transmit a message that is easily understood by an apparatus administrator, color representation, rather than figure representation, is intuitive and is easy to understand.

In the case of the second embodiment, in representation of the out-of-paper state, the example in which the figure shape is changed from the original one is described. If the representation of toner color is employed, the color of figures may be changed to the color for which the remaining amount is equal to or less than the threshold. Alternatively, the color may be used directly to the background color itself. Alternatively, depending on the color of the toner whose remaining amount is equal to or less than the threshold, a portion whose color is to be changed may be changed.

For example, in the concrete example in which the case of the out-of-paper state in the second embodiment is described, circular figures (circles, ellipses, or ovals) are displayed on the background in the normal state. In the third embodiment, when a toner color is to be notified, the circular figures are formed in the color of the toner whose remaining amount is equal to or less than the threshold. Thus, the toner whose remaining amount is equal to or less than the threshold is notified in such a manner that the notification is easily understood. When the circular figures are formed in the color of the toner whose remaining amount is equal to or less than the threshold, depending on the remaining amount of toner, the density of the toner color in which the circular figures are formed may be changed. For example, the smaller the remaining amount of toner is, the higher the density of the toner color in which the circular figures are formed may be. Alternatively, the density may be the lowest as much as possible to the recognizable extent. In this case, in FIG. 6A, the color of the solid-color circular figures in the normal state is desirably a color other than cyan, yellow, magenta, or black, causing the state to be easily recognized.

When the remaining amounts of multiple color toners are equal to or less than the threshold, in FIGS. 6B and 6C, the circular figures of the multiple colors may be displayed in the same screen at the same time, or may be displayed so as to be alternately switched.

If a state change of each unit of the image forming apparatus is a change of the unit which occurs more frequently, such an change may be displayed with an image change different from an image change for a change of each unit of the same type. For example, black toner is toner whose consumption amount is large, and is replenished frequently. Thus, the portion displayed in the solar is changed, causing the notification to be easily recognized. Similarly, in the case of the out-of-paper state, A4-size paper, which is used particularly frequently, may be displayed by changing its figures and attributes in order to differentiate from the other sizes.

Fourth Embodiment

Figure 7:
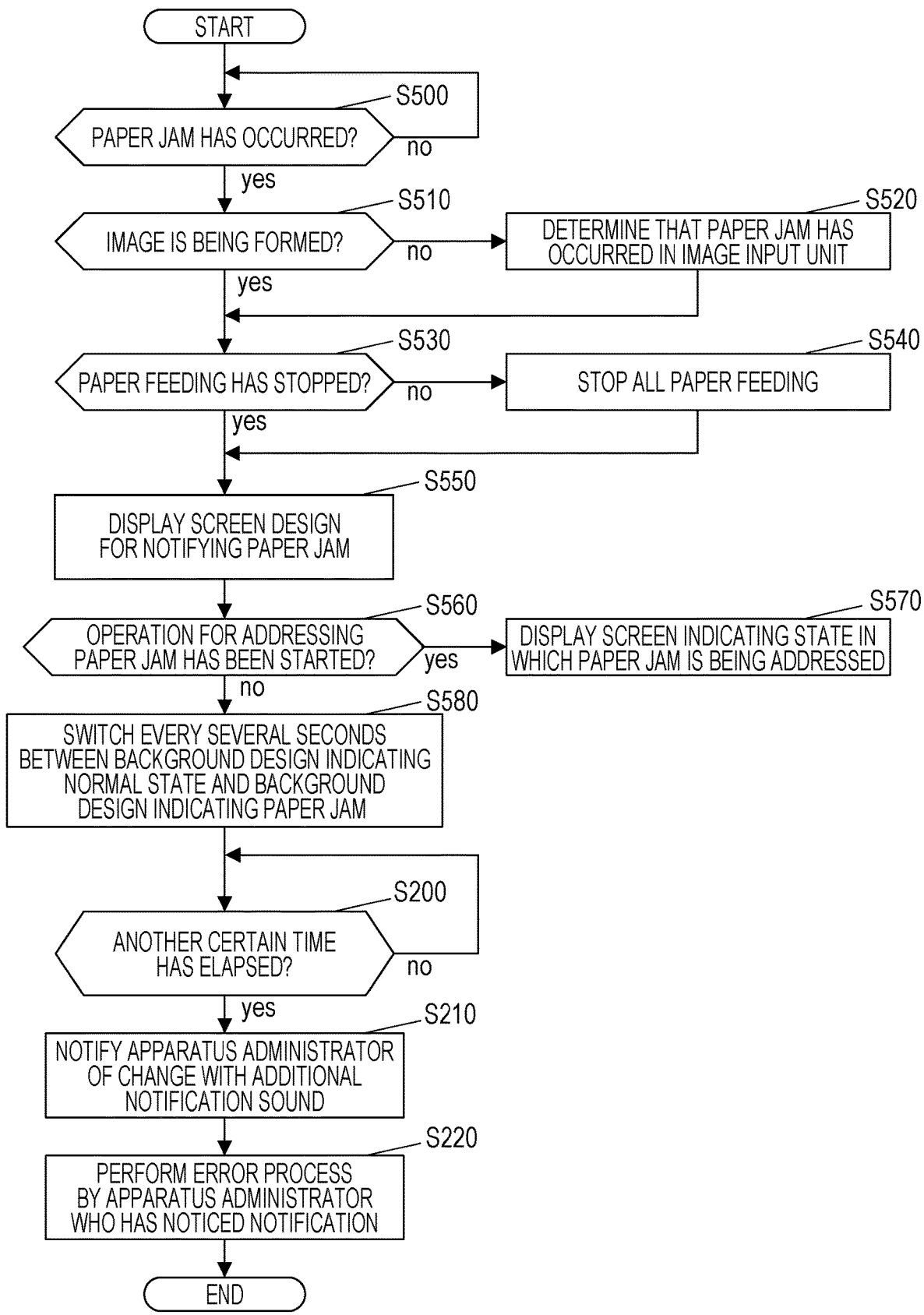
FIG. 7 is a flowchart of operations performed in a paper-jam state, according to a fourth embodiment of an image forming apparatus provided by the present disclosure.

Operations performed to address a paper jam, according to a fourth embodiment of the image forming apparatus 1, will be described on the basis of the flowchart in FIG. 7.

The controller 100 determines whether or not a paper jam has occurred (step S500). If a paper jam has occurred, the controller 100 determines whether or not an image is being formed (step S510). If a paper jam occurs while an image is not being formed, the controller 100 determines that the paper jam has occurred while a document is being read by the image input unit 120 (step S520).

The controller 100 determines whether or not paper feeding has stopped (step S530). If paper ceding has not stopped, all paper feeding is stopped (step S540), and occurrence of another paper jam is avoided.

Figure 8A:
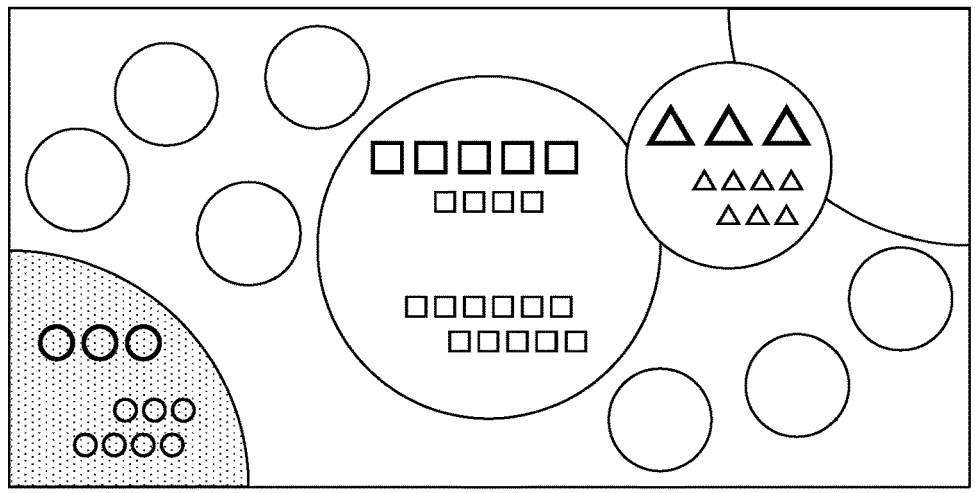
FIGS. 8A to 8C are diagrams illustrating exemplary changes of a screen in response to a notification indicating that a paper jam has occurred, according to the fourth embodiment of the image forming apparatus provided by the present disclosure, and a notification indicating that a breakdown has occurred, according to a fifth embodiment, where
Figure 8B:
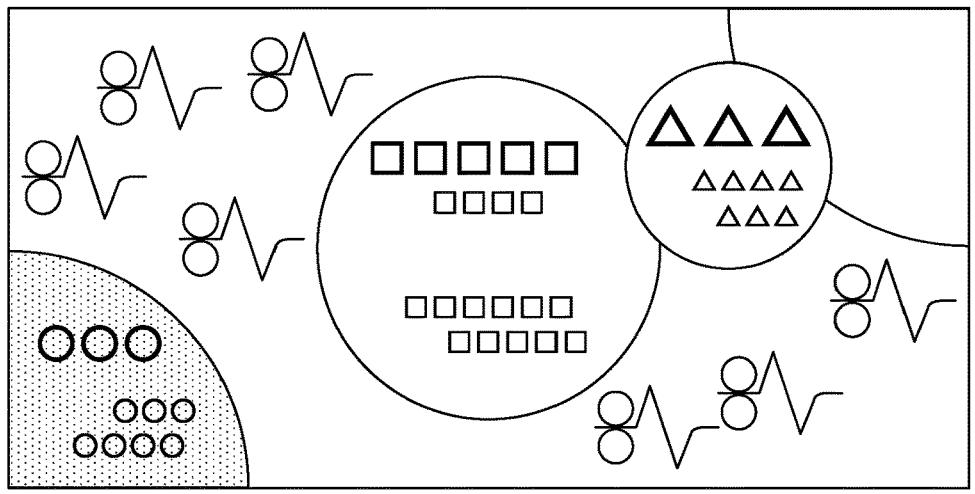

The display unit 160 displays the screen design for notifying a paper jam (step S550) so that an apparatus administrator is notified of the paper jam. For example, the notification is given through a change from the design indicating the normal state in FIG. 8A to the design indicating a paper jam as illustrated in FIG. 8B. The controller 100 determines whether or not an operation for addressing the paper jam has been started (step S560). If the operation seems to be started, a screen indicating the state in which the paper jam is being addressed is displayed (step S570). If the operation has not been started, a screen in which switching is performed every several seconds between the background design indicating the normal state and the background design indicating a paper jam is displayed on the display unit 160 (step S580). With elapse of time, until an error process is performed (step S220), steps S200 to S220 are performed similarly to the first and second embodiments.

Assume the following case: the case in which a state change of each unit of the image forming apparatus 1 indicates a failure in the sheet feeding mechanism 156, in the image output unit 150, for transporting an image that is to be formed or has been formed on a recording medium (that is, a sheet of paper), that is, printed matter that is being printed or has been printed; or the case in which the state change indicates a failure in transportation of a document in the document feeding mechanism 122 in the image input unit 120. That is, either case indicates a paper jam in the mechanism for paper feeding. In this case, an image that specifically indicates a paper jam is displayed so that an apparatus administrator is notified. If a state change of each unit indicates a paper jam, the change is to be addressed urgently. Therefore, not only an image but also a sound or the like may be used so that a notification is given.

A failure in paper feeding described above is a state change of each unit which occurs while a user is using the image forming apparatus 1, and is an abnormal accident recognizable to the user. Therefore, an image, which does not provide an uncomfortable and unnatural feeling to a user and whose message is transmitted only to an apparatus administrator, is unnecessary in notifying a user of the state change of the unit.

Desirably, a user recognizes that a notification for urgent and immediate measures is being given to an apparatus administrator, through the image and/or other ways. This is because the user may expect measures for the abnormal state that are to be taken immediately, and feels comfortable.

Especially, in the case of a paper jam, an image indicating the position at which the paper jam has occurred may be displayed. In some cases, a paper jam in the document feeding mechanism 122 causes a user's document to be damaged. Thus, the position at which a paper jam has occurred is desirably recognized by both a user and an apparatus administrator.

Fifth Embodiment

In the case of a breakdown according to a fifth embodiment of the image forming apparatus 1, the process flow of recognizing a state change of each unit and addressing the change is performed according to that in the case of a paper jam.

Figure 8C:
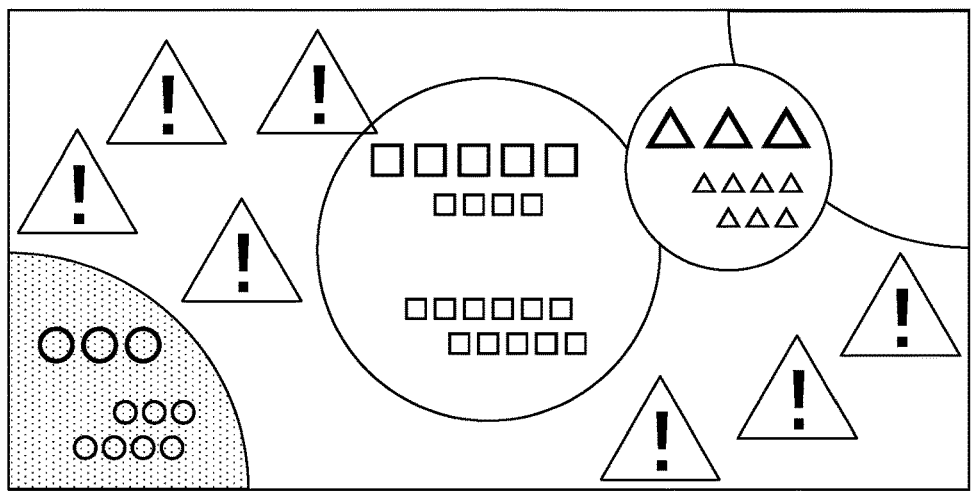

When a state change of each unit is caused by a failure, that is, a breakdown of the image forming apparatus 1, the display unit 160 displays an image for notifying a user and an apparatus administrator of the state in which the apparatus has broken down. That is, for example, the screen is changed from the screen in the normal state in FIG. 8A to the screen indicating a breakdown as illustrated in FIG. 8C.

When an apparatus administrator operates the operation unit 180 to input, to the controller 100, information indicating that the failure of the image forming apparatus 1 has been recognized, the controller 100 finds that the apparatus administrator has recognized that the failure has occurred in the image forming apparatus 1 and the image forming apparatus 1 is incapable of being used. However, the controller 100 continuously displays, on the display unit 160, an image indicating that a failure has occurred in the image forming apparatus 1 and that the image forming apparatus 1 is incapable of being used, to a user and a person who is going to use the apparatus.

A failure, that is, a breakdown, of the image forming apparatus 1 described above is addressed as follows. If, like a paper jam, clear information about a state change of each unit of the apparatus is transmitted from the unit to the controller 100, and if an apparatus administrator recognizes the state of the failure and has clear prospects, to some degree, for the reason and addressing processes, an image corresponding to the degree of the prospects is displayed on the display unit 160.

Even when an apparatus administrator recognizes the state of the failure of the image forming apparatus 1, if it is clear that recovery from the failure fails to be made through a normal addressing process, or if the controller fails to specify the reason and a sophisticated repair is to be performed, a message indicating that the apparatus is incapable of being used for the time being is displayed on the display unit 160 to a user and a person who is going to use the apparatus.

Assume the following case: the case in which, although the degree of a failure of the image forming apparatus 1 is slight, a time has elapsed from occurrence of the failure while it is not sure that an apparatus administrator has recognized occurrence of the failure; or the case in which an apparatus administrator is to recognize occurrence of a failure urgently because of the degree or urgency of the failure. In this case, an image providing a stronger message is displayed on the display unit 160. Further, for example, a notification using a sound may be also used so that an apparatus administrator is notified with the maximum degree of attention.

Sixth Embodiment

Figure 9:
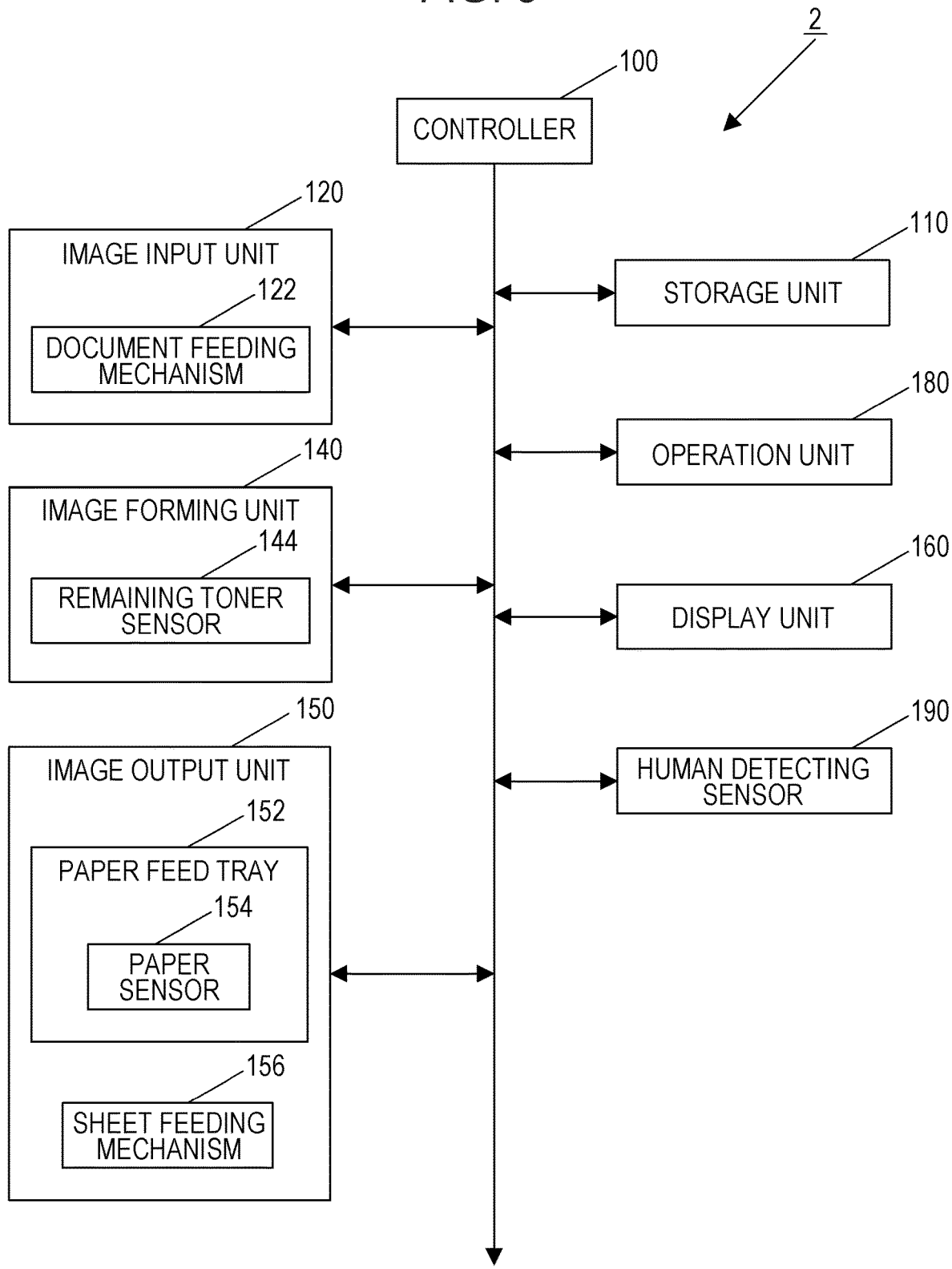
FIG. 9 is a block diagram illustrating the configuration of an image forming apparatus provided by the present disclosure.

FIG. 9 is a block diagram illustrating the configuration of an image forming apparatus 2 according to a sixth embodiment. This configuration further includes a human detecting sensor 190 in addition to the configuration of the image forming apparatus 1 according to the first to fifth embodiments.

The human detecting sensor 190 detects, through infrared radiation or image recognition using a camera, the state in which a user of the image forming apparatus 2 stays from the time point at which the user starts the apparatus to the time point at which the user ends use of the apparatus, including the period in which the user is using the apparatus.

Figure 10:
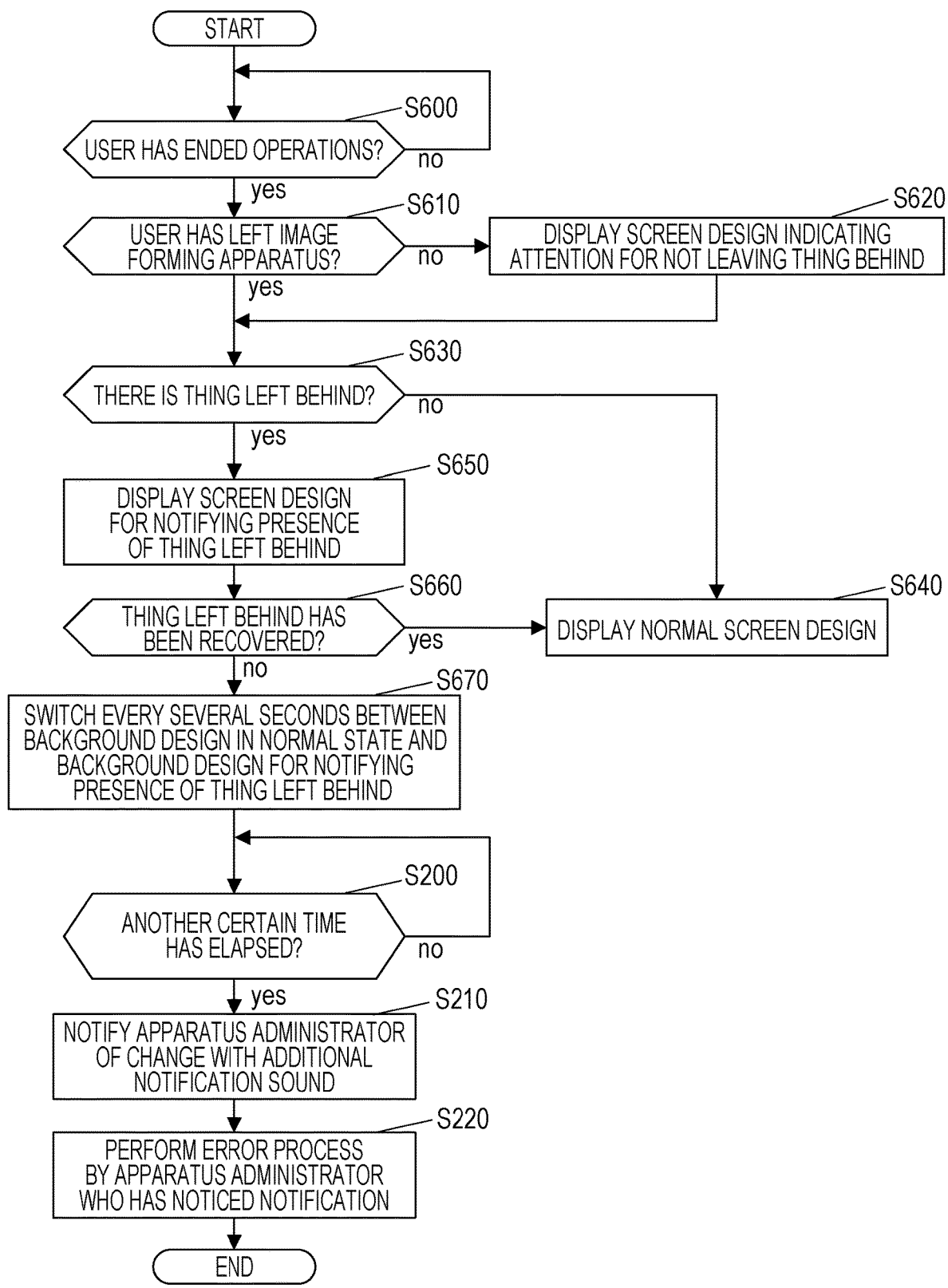
FIG. 10 is a flowchart of operations performed when a thing left behind has been detected, according to a sixth embodiment of an image forming apparatus provided by the present disclosure.

Operations performed when a thing left behind is detected, according to the sixth embodiments of the image forming apparatus 2, will be described on the basis of the flowchart in FIG. 10.

The controller 100 determines whether or not a user ends operations (step S600). If the user ends operations, the controller 100 determines whether or not the user has left the image forming apparatus 2 on the basis of information from the human detecting sensor 190 (step S610). If the user has not left, a screen design indicating an attention for not leaving a thing behind is displayed on the display unit 160 (step S620). If the user has left the image forming apparatus 2, the controller 100 determines whether or not there remains an image that has been output from the document feeding mechanism 122 of the image input unit 120 or the image forming unit 140, that is, there is a thing left behind (step S630). If there is not a thing left behind, the normal screen design is displayed on the display unit 160, and the process returns to the normal waiting state (step S640). If there is a thing left behind, a screen design for notifying presence of a thing left behind is displayed (step S650).

After that, the controller 100 determines whether or not the thing left behind has been recovered (step S660). If the thing left behind has been recovered, the normal screen design is displayed on the display unit 160, and the process returns to the normal waiting state (step S640). If the thing left behind has not been recovered, a screen is displayed on the display unit 160 so as to be switched every several seconds between the background design in the normal state and the background design for notifying presence of a thing left behind (step S670). With elapse of time, until an error process is performed (step S220), steps S200 to S220 are performed similarly to the first to third embodiments.

In a state change of each unit of the image forming apparatus 2, a thing left behind collectively means that there remains printed matter which has been output after image formation as a result of use of the apparatus by a user, or that there remains a document or a storage medium, such as a USB memory or an optical recording media, which is carried by a user when the user uses the apparatus. Although the user has left at least the area in which the user reaches the image forming apparatus 2, if such a thing left behind has not been recovered, an image indicating presence of a thing left behind is displayed on the display unit 160.

An object of the operations is that, if just a short time has elapsed starting from the time point at which the user has left the area in which the user reaches the image forming apparatus 2, the user is notified by displaying an image for providing attention in order to urge the user themselves to recover a thing that is left behind and that is to be recovered by the user. In addition, a notification using a sound is also used.

Assume that the case where a certain degree of time has elapsed starting from the time point at which the user has left the area in which the user reaches the image forming apparatus 2, and where there is no chance that the user themselves recovers the thin that is left behind and that is to be recovered by the user. In this case, in terms of privacy protection, it is not desirable that presence of a thing left behind is notified to the general public including other users. An object of the operations is that the target to whom attention is provided is switched to an apparatus administrator, and that the apparatus administrator is notified. Thus, an image for urging an apparatus administrator to recover the thing left behind is displayed. In addition, for example, a notification using a sound is also used.

Seventh Embodiment

Figure 11:
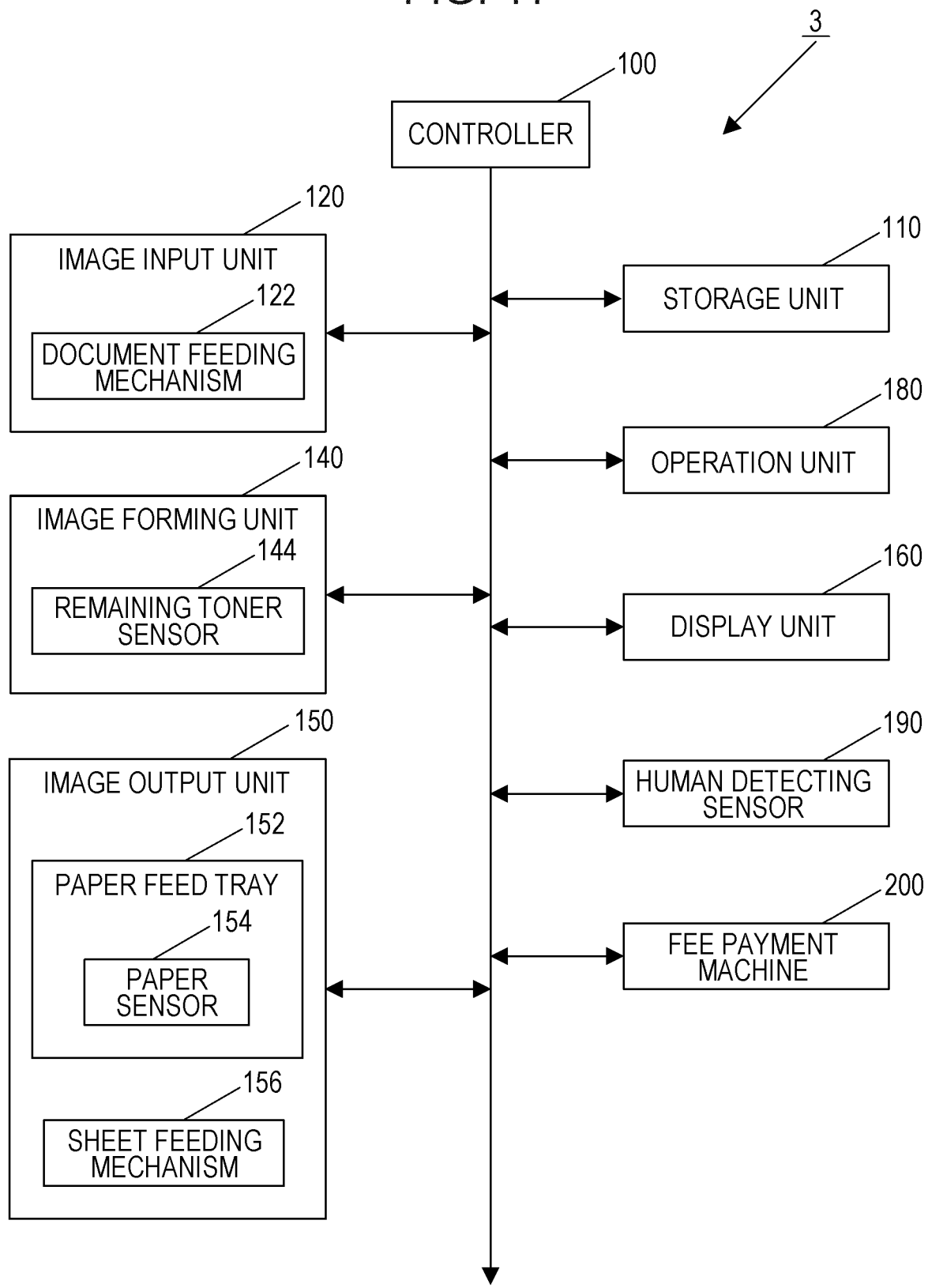
FIG. 11 is a block diagram illustrating the configuration of as image forming apparatus provided by the present disclosure.

FIG. 11 is a block diagram illustrating the configuration of an image forming apparatus 3 according to a seventh embodiment. This configuration further includes a fee payment machine 200 in addition to the configuration of the image forming apparatus 2 according to the sixth embodiment.

The fee payment machine 200 not only gives change for cash payment but also supports payment using various IC cards when the apparatus may be used in public in a shop or the like so as to provide a service with a charge.

In the image forming apparatus 3 according to the seventh embodiment, when a state change of each unit indicates that the change for payment becomes equal to or less than a threshold, the fee payment machine 200 transmits, to the controller 100, information about the state as a state change of each unit.

If the remaining amount of change is equal to or less than the threshold, an apparatus administrator addresses and solves the state by supplying change similarly to the case of the out-of-paper state in the second embodiment and the case of the out-of-toner state in the third embodiment. Thus, the way of display on the display unit is similar to the case of the out-of-paper state and the case of the out-of-toner state. Figures and design which provide particularly an image of money are used and displayed.

Eighth Embodiment

In the image forming apparatus 3, according to an eighth embodiment, when a state change of each unit indicates that there remains change left behind after use of the apparatus by a user, the fee payment machine 200 transmits, to the controller 100, information about the state as a state change of each unit.

Change left behind is a kind of a thing left behind. Therefore, the way of display on the display unit 160 is similar to the case of a thing left behind according to the sixth embodiment. Figures and design which provide especially an image of money are used and displayed on the display unit 160.

Ninth Embodiment

According to a ninth embodiment of the image forming apparatuses 1 to 3, when a state change of each unit indicates that an apparatus administrator is performing an apparatus management operation, the display unit displays an image indicating that an apparatus administrator is performing an apparatus management operation. The process flow is performed according to those in the embodiments described above. If an apparatus administrator is performing an apparatus management operation, regardless of whether a user is using the apparatus or is going to use the apparatus, the user basically fails to use the image forming apparatus until the apparatus management operation ends. Therefore, in addition to a user who is using the apparatus or who is going to use the apparatus, it is better to notify a user, who wants to use the apparatus, that the apparatus is incapable of being used for the time being, in such a manner that the user easily understands the message.

When use of the apparatus is stopped because of an apparatus management operation, if the apparatus management operation is an operation for replenishing paper or toner, the reason and the addressing process of the replenishment operation are clear. Thus, an image from which a user recognizes that not much time is taken until restart of use of the apparatus and that it is not a serous state may be displayed on the display unit 160.

When the apparatus management operation is an operation for addressing a paper jam, there may be prospects for recovery, but it may not be clear that the recovery is completed just in a normal process. Therefore, a message that urgent use is not allowed may be displayed on the display unit 160.

When, other than the states described above, an apparatus management operation takes time in addressing a trouble, a message indicating this may be displayed on the display unit 160.

In the case in which an image for transmitting information about the apparatus management operation described above is displayed, the controller 100 determines, in accordance with the previous state change of each unit, the degree of the change, and displays information about the degree on the display unit 160.

In the embodiments described above, an image displayed on the display unit 160 may be changed as follows. The image may be divided into multiple layers actually or formally. In a subset of the layers, attributes, such as figures, colors, lighting states, and motions, of the images in the layers may be changed. Then, the resulting image may be obtained by combining again all of the layers together, or by configuring the image as an image regarded as a combination of all of the layers.

Figure 12:
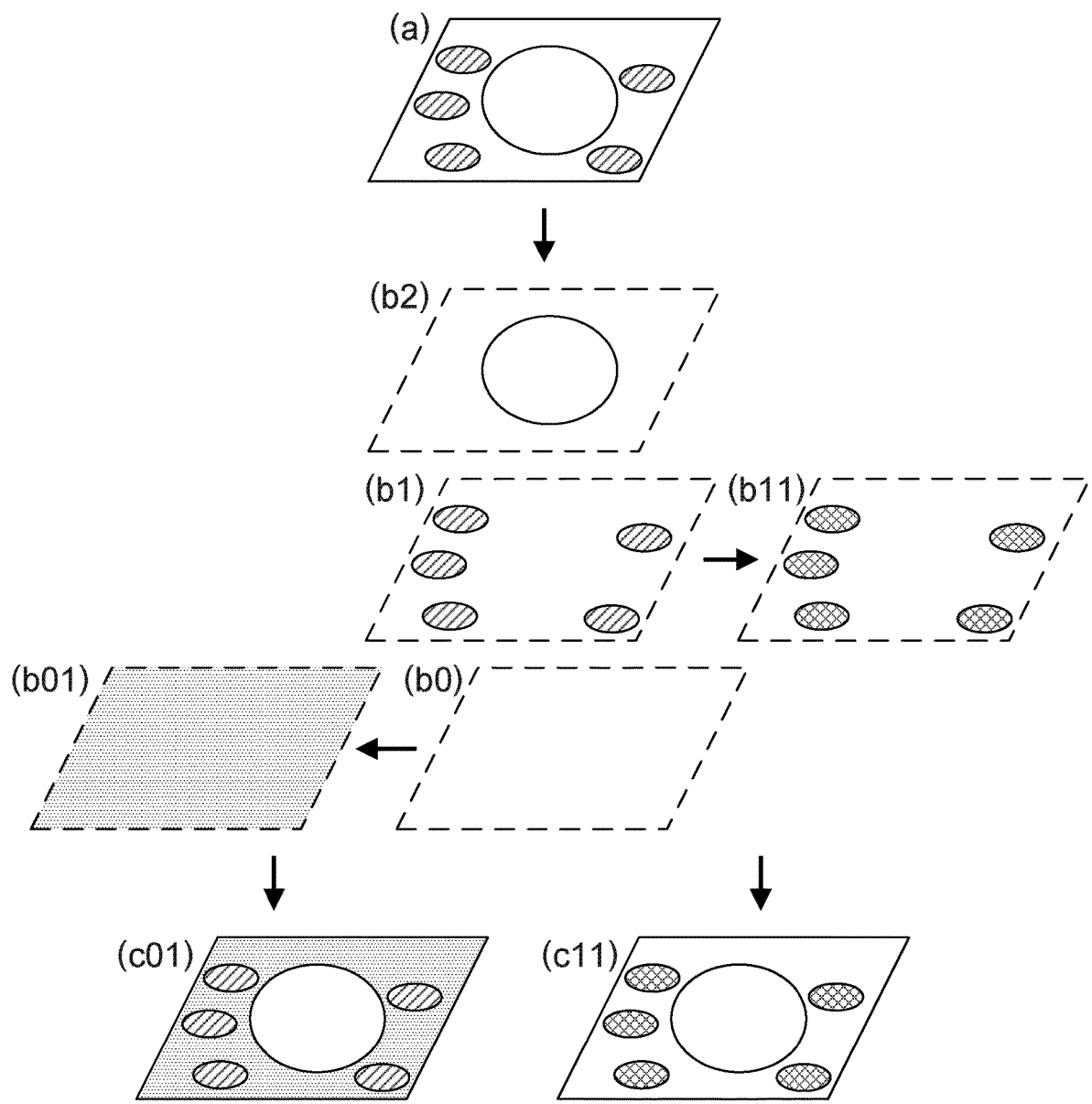
FIG. 12 is a diagram illustrating the configuration of an image displayed by the image forming apparatuses provided by the present disclosure.

That is, as illustrated in FIG. 12, when the image (a) is to be changed to the image (c01), the parts included in the image (a) are separated to the layers (b0), (b1), and (b2). The layer (b0) is changed to the layer (b01). Thus, the image (c01) may be obtained by combining the layers (b01), (b1), and (b2) again, or the image (c01) regarded as having the configuration obtained after the processes described above may be obtained. Similarly, when the image (a) is to be changed to the image (c11), the image (a) is separated into the layers (b0), (b1), and (b2). The layer (b1) is changed to the layer (b11). Thus, the image (c11) may be obtained by combining the layers (b0), (b11), and (b2) again, or the image (c11) regarded as having the configuration obtained after the processes described above may be obtained.

In the embodiments described above, the example in which the image forming apparatus 1 includes the controller 100, the storage unit 110, the image input unit 120, the image forming unit 140, the image output unit 150, the operation unit 180, and the display unit 160 is described. As a matter of course, in order to implement the disclosure described in the embodiments, another method may be employed. For example, a display is used as the display unit 160; a printer is used as the image forming unit 140; a camera or the like may be used as the image input unit 120. A computer for exerting control is connected to the image input unit 120, the image forming unit 140, and the display unit 160. Thus, the disclosure may be implemented as an image display method for notifying an apparatus administrator, who performs processes in accordance with a state change of each unit, of a state change of each unit.

For the sake of convenience for explanation, the above-described embodiments are described separately. As a matter of course, the embodiments may be combined for implementation in the technically possible range.

Thus, the embodiments described in the specification may be combined for implementation in a range in which no conflicts are produced.

A program executed in the apparatuses in the embodiments is a program (a program for functioning a computer) for controlling a CPU or the like so that the functions of the embodiments described above are implemented. Information handled in the apparatuses is accumulated temporarily in a temporary storage device (for example a random access memory (RAM)) when the information is processed. After that, the information is stored in various types of storage devices, such as a read only memory (ROM), an HDD, and an SSD, and is read, modified, and written by the CPU when appropriate.

As described above, the disclosure is not limited to the embodiments described above. Various changes may be made in the scope of claims. It is clear that those skilled in the art may conceive various exemplary changes and modifications in the range described in the scope of claims. That is, embodiments obtained by combining together technical components, which are obtained by making changes appropriately without departing from the gist of the disclosure, are included in the technical scope of the disclosure.

Use of the disclosure achieves an image forming apparatus in which a user and an apparatus administrator are notified appropriately of a state change of each unit.

The present disclosure contains subject matter related to that disclosed in Japanese Priority Patent Application JP 2018-096398 filed in the Japan Patent Office on May 18, 2018, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:
1. An image forming apparatus comprising;
an image forming unit;
an image output unit;

a sheet feeding mechanism that transports a recording medium;

a display that displays a screen; and a controller that controls the units, wherein the controller detects a state change of each unit of the image forming apparatus, and exerts control so as to cause the display to display, in accordance with the detected state change of the unit, an image indicating the state change of the unit, and wherein the image indicating the state change of the unit includes a color and a figure which represent a reason of the state change, wherein, when the controller determines that an apparatus administrator does not take measures to the state change of the unit within a certain time, the controller changes the display of the image indicating the state change of the unit.

2. The image forming apparatus according to claim 1, wherein the image indicating the state change of the unit is an image viewable in such a degree that there is no obstacle to an operation of a user of the image forming apparatus, and wherein the image indicating the state change of the unit is an image which is capable of notifying the apparatus administrator of information about the state change of the unit, the apparatus administrator performing a process in accordance with the state change of the unit.

3. The image forming apparatus according to claim 1, wherein the image indicating the state change of the unit is an image which further involves at least one of additional elements, the additional elements including a shade of a color, a change in a lighting state, and a motion.

4. The image forming apparatus according to claim 1, wherein, if the state change of the unit of the image forming apparatus indicates that a remaining quantity of recording media is equal to or less than a threshold, a change in the image displayed on the display is a change of a figure representing a recording medium, the recording media being media on which images are formed.

5. The image forming apparatus according to claim 1, wherein, if the state change of the unit of the image forming apparatus indicates that a remaining amount of at least one toner is equal to or less than a threshold, the change of the image is such that a color of components representing toner is changed to a color of the at least one toner whose remaining amount is equal to or less than the threshold.

6. The image forming apparatus according to claim 1, wherein, when the state change of the unit of the image forming apparatus is caused by a transport failure regarding a recording medium in the sheet feeding mechanism, an image indicating the transport failure is displayed.

7. The image forming apparatus according to claim 1, wherein, when the state change of the unit of the image forming apparatus is caused by a failure of the image forming apparatus, an image indicating the failure of the image forming apparatus is displayed.

8. The image forming apparatus according to claim 1, wherein, when the state change of the unit of the image forming apparatus indicates that there remains printed matter on the image output unit after a user of the image forming apparatus ends use of the image forming apparatus, an image indicating the remaining printed matter is displayed.

9. The image forming apparatus according to claim 1, further comprising:

an image input unit, wherein, when the state change of the unit of the image forming apparatus indicates that there remains a document in or on the image input unit after a user of the image forming apparatuses ends use of the image forming apparatus, an image indicating that the document remains is displayed.

10. The image forming apparatus according to claim 1, further comprising:

a fee payment machine that charges in accordance with use of the image forming apparatus, wherein, if the state change of the unit of the image forming apparatus indicates that a remaining amount of change used in fee payment becomes equal to or less than a threshold when a user of the image forming apparatus ends use of the image forming apparatus, a change of an image displayed on the display is a change in a figure representing shortage of change.

11. The image forming apparatus according to claim 1, further comprising:

a fee payment machine that charges in accordance with use of the image forming apparatus, wherein, if the state change of the unit of the image forming apparatus indicates that, when a user of the image forming apparatus ends use of the image forming apparatus, there remains change after fee payment, a change of an image displayed on the display is a change of a figure representing the remaining change.

12. A control method for an image forming apparatus including an image forming unit, an image output unit, a sheet feeding mechanism that transports a recording medium, a display that displays a screen, and a controller that controls the units, the method comprising:

detecting a state change of each unit of the image forming apparatus; and displaying, on the display, an image indicating the detected state change of the unit in accordance with the state change of the unit, wherein the image indicating the state change of the unit includes a color and a figure which represent a reason of the state change, wherein, when the controller determines that an apparatus administrator does not take measures to the state change of the unit within a certain time, the controller changes the display of the image indicating the state change of the unit.

* * * * *